(12) United States Patent
Kranich et al.

(10) Patent No.: US 6,363,648 B1
(45) Date of Patent: Apr. 2, 2002

(54) LASER AIMING LIGHT FOR FIREARMS

(75) Inventors: David L. Kranich, Prescott; Daryl Anthony Riva, Prescott Valley, both of AZ (US)

(73) Assignee: William H. Grube, Emmaus, PA (US)

( * ) Notice: Subject to any disclaimer, the term of this patent is extended or adjusted under 35 U.S.C. 154(b) by 0 days.

(21) Appl. No.: 09/491,728

(22) Filed: Jan. 27, 2000

(51) Int. Cl.$^7$ .............................................. F41G 1/34
(52) U.S. Cl. .......................................... 42/117; 42/114
(58) Field of Search ........................... 42/103, 114, 117

(56) References Cited

U.S. PATENT DOCUMENTS

| | | | |
|---|---|---|---|
| 4,152,754 A | * 5/1979 | de Filippis et al. | 362/113 |
| 4,233,770 A | * 11/1980 | de Filippis et al. | 42/103 |
| 4,697,226 A | * 9/1987 | Verdin | 362/110 |
| 4,738,044 A | 4/1988 | Osterhout | 42/103 |
| 4,991,183 A | 2/1991 | Meyers | 372/100 |
| 5,036,517 A | 7/1991 | Meyers | 372/29 |
| 5,042,048 A | 8/1991 | Meyer | 372/108 |
| 5,056,097 A | 10/1991 | Meyers | 372/38 |
| 5,064,988 A | 11/1991 | E'nama et al. | 219/121.6 |
| 5,237,773 A | * 8/1993 | Claridge | 42/103 |
| 5,276,988 A | 1/1994 | Swan | 42/101 |
| 5,355,609 A | 10/1994 | Schenke | 42/103 |
| 5,359,779 A | 11/1994 | Polk et al. | 33/241 |
| 5,400,540 A | 3/1995 | Solinsky et al. | 42/103 |
| 5,430,967 A | 7/1995 | Woodman, III et al. | 42/103 |
| 5,584,137 A | 12/1996 | Teetzel | 42/103 |
| 5,903,996 A | * 5/1999 | Morley | 42/103 |

OTHER PUBLICATIONS

Brochure entitled "AIM–1 Mini Designator I.R. Laser Sight", International Technologies (Lasers) Ltd., Israel.
Brochure entitled "LPL–30, Laser Long–Range Pointer", International Technologies (Lasers) Ltd. Israel.
Brochure entitled "AIM–1/R Visible Laser Aiming Light", International Technologies (Lasers) Ltd., Israel.
Brochure entitled "AIM–1/D IR–Laser Aiming Light", International Technologies (Lasers) Ltd. Israel.
Brochure entitled "AIM–1/DLR Long–Range IR Laser Aiming Light", International Technologies (Lasers) Ltd., Israel.
Brochure entitled "AIM–1/MLR Long–Range IR Laser Aiming Light", International Technologies (Lasers) Ltd., Israel.
Brochure entitled "AIM–1/SLR Long–Range IR Laser Aiming Light", International Technologies (Lasers) Ltd., Israel.
Brochure entitled "AIM–1/SLX Long–Range IR Laser Aiming Light", International Technologies (Lasers) Ltd., Israel.
Brochure entitled "AIM–1/EXL IR Laser Aiming Light", International Technologies (Lasers) Ltd., Israel.
Product brochure entitled "International Technologies Lasers".
Product specification for IZLID IP 100 mWatt Postionable Infra–Red Illuminator (BEM Part No. 424P), B.E. Meyers & Co., Inc., Jun. 4, 1998.

(List continued on next page.)

Primary Examiner—Charles T. Jordan
Assistant Examiner—John W. Zerr
(74) Attorney, Agent, or Firm—Cahill, Sutton & Thomas P.L.C.

(57) ABSTRACT

A laser aiming light for firearms includes interchangeable switches for selectively limiting the laser output to an eye safe level for training purposes and for providing full power for operational use in a combat zone. A capability for using a remote switch is provided. As the output of the laser diode and associated components are temperature sensitive, temperature compensating circuitry ensures adequate power at high, as well as at low, ambient temperatures. Power is provided by enclosed conventional batteries retained by a sealed cap maintained in place by a pivotally mounted retainer and locking mechanism.

49 Claims, 11 Drawing Sheets

OTHER PUBLICATIONS

Product specification for IZLID 200P–200 mWatt Postionable Infra–Red Illuminator (BEM Part No. 424P), B.E. Meyers & Co., Inc., Apr. 3, 1998.

Product Specification for IZLID–II™ 1 Watt Infared Zoom Laser Illuminator/Designator, Night Vision Equipment Company.

Article entitled Infrared Zoom Laser, p. 21–24.

Brochure for U.S. Military Infrared Aiming Lights, AN/PAQ–4C 1000 Meters Range and Eye Safe*, Insight Technology Incorporated.

Brochure for U.S. Military Standard AN/PEQ–2 Infrared Target Pointer/Illuminator/Aiming Laser (ITPIAL) Dual Beam Laser Device, Insight Technology Incorporated.

Wilcox Industries Corp. product brochure, 1998.

Operators Manual for the IZLID II Model #422, Night Vision Equipment Company.

* cited by examiner

PHOTO DIODE FEEDBACK CIRCUIT

TEMPERATURE COMPENSATION CIRCUIT

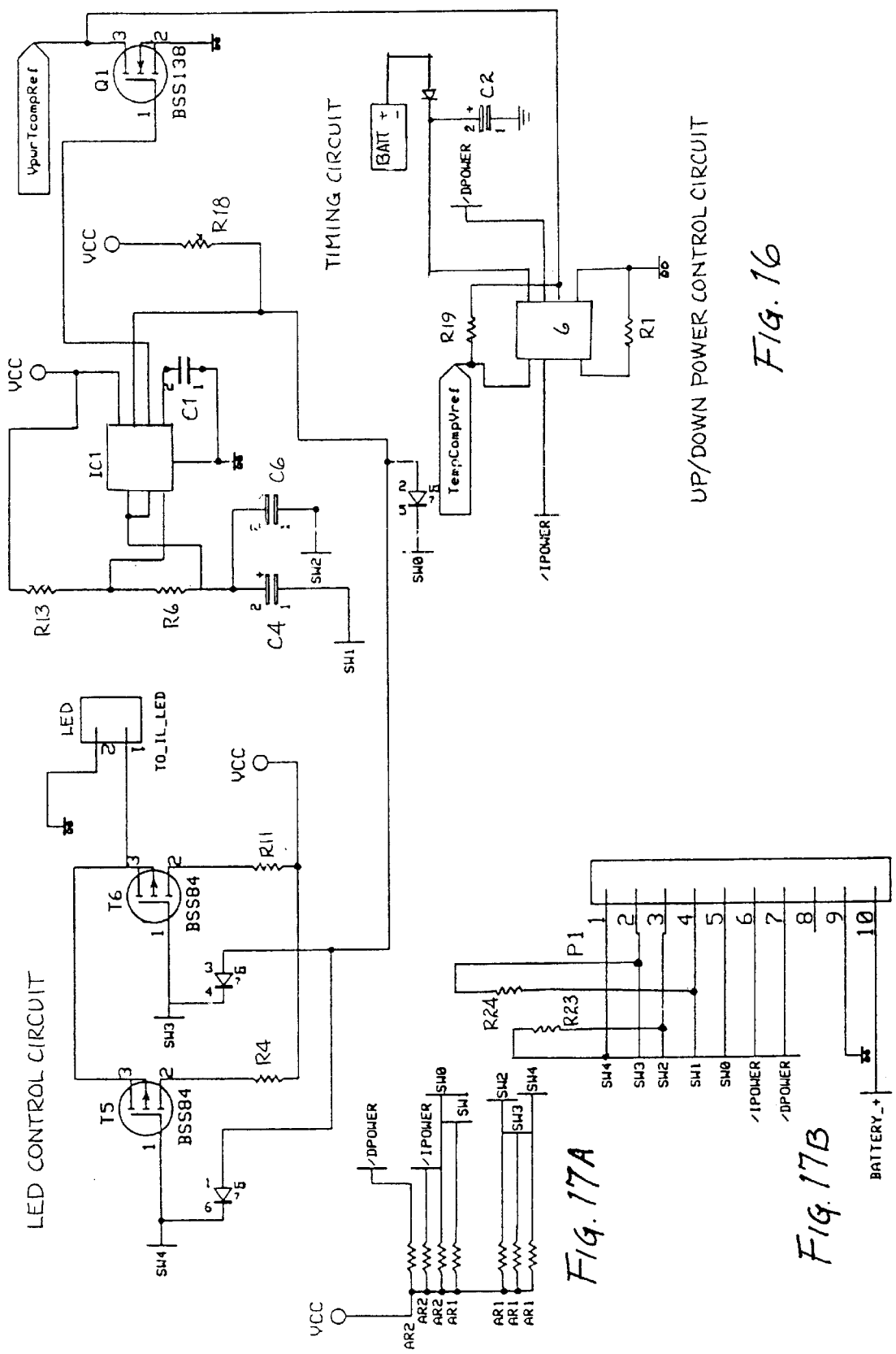

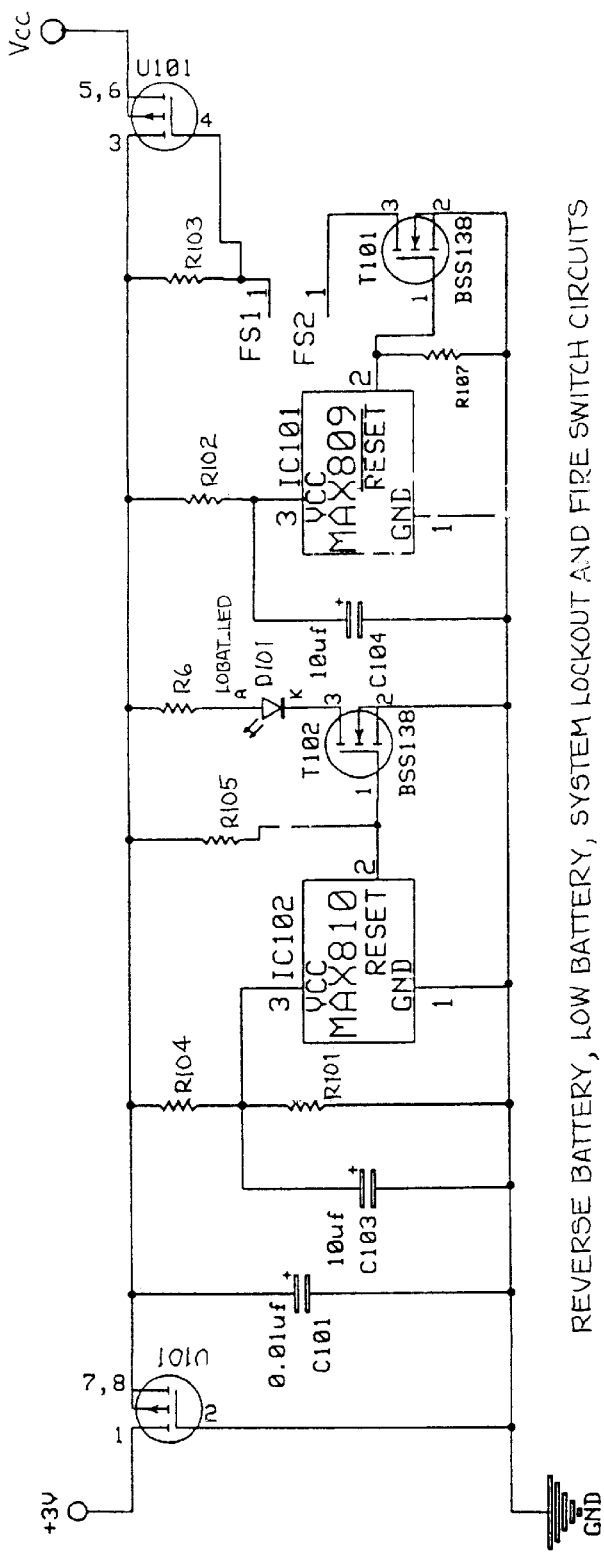
FIG. 18
REVERSE BATTERY, LOW BATTERY, SYSTEM LOCKOUT AND FIRE SWITCH CIRCUITS
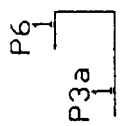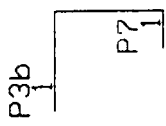
FIG. 19

LASER AIMING LIGHT FOR FIREARMS

BACKGROUND OF THE INVENTION

1. Field of the Invention

The present invention relates to laser aiming lights for firearms and, more particularly, to temperature compensating circuitry for maintaining the power level of a laser diode and associated components irrespective of changes in ambient temperature and to a removable fire and power mode selection switch..

2. Description of Related Art

Conventional manually operated firearms have had since time immemorial mechanical sights for aiming the firearm. These sights require the user to visually align the sights with a target. Because of the slight angular deviations encountered in aligning mechanical sights, accuracy is compromised well short of the meaningful range of accuracy of the firearm and the associated projectile. To increase the range of accuracy, telescopic sights have been employed to obtain an effective range of accuracy of several hundred yards and which is, in part, a function of the muzzle velocity and type of firearm. Irrespective of whether mechanical sights or telescopic sights are used, the required visual alignment with the target creates a potentially life-threatening situation in a combat environment. That is, due to underbrush or other obstacles, visual alignment may not be quickly possible and the firearm may be momentarily useless. Furthermore, the likelihood of hitting a target is often a function of how steadily the firearm is held during the aiming and firing of the firearm. In critical situations, accuracy may be lost due to premature firing.

With the advent of small-sized lightweight laser diodes, associated circuitry and power supplies, aiming devices for firearms incorporating lasers came about. The frequency of the emitted aiming laser beam may be within or outside the visible spectrum. To ensure correspondence between the aiming laser beam and the trajectory of the projectile, the aiming laser beam may be bore sighted, as is well known. Such bore sighting is accurate to a certain range, which is a function of the type and nature of projectile, muzzle velocity and barrel configuration of the firearm. Most laser or infrared aiming beams incorporate adjustments for elevation and windage as a function of the range to the target and ambient climatological conditions, whereby accuracy at substantial ranges can be achieved.

A primary benefit of a laser aiming device is that the target is identified with a dot visible with goggles or the naked eye depending on whether or not the frequency of the laser beam is within the visible spectrum. When the dot is on a target, the firearm may be fired in whatever position it may be at that moment with a reasonable expectation that the projectile will hit the target. Thus, visual alignment of the firearm is no longer mandatory. If the laser aiming device emits radiant energy in the non-visible frequency range, the target will be unaware that a firearm is being aimed at it/him/her; necessarily, the user of the firearm must wear goggles of a type that will permit viewing the laser beam irradiating the target.

Combat units and others using laser aiming devices with their firearms conduct training exercises simulating combat. These exercises usually involve aiming the laser aiming devices at personnel. Since some combat environments require power levels that could cause permanent damage to one's eyesight unnecessary exposure to the likelihood of injury is present during training operations. To reduce the likelihood of injury during training, the power levels of the laser aiming devices must be prevented from exceeding a predetermined level (eye safe level). Usually, a switch on the laser aiming device permits selection of the output power at an eye safe level or at a maximum level. A danger of such prior art switches is that of inadvertently, by accident, or through forgetfulness, positioning the switch in the maximum power level position when it should be in the eye safe power level position. The resulting likelihood of injury to personnel of the opposing forces in a training exercise becomes very high and inexcusable.

Furthermore, the power output of laser diodes is essentially inversely proportional to temperature. When the output power is set at an eye safe level equal to or less than 0.7 milliwatts (mw) at a given ambient temperature, the power output may exceed this level upon a drop in temperature. To prevent the resulting possible hazard the output power should be prevented from increasing as a function of temperature. Thus, a benefit would be achieved if the laser aiming light maintained an essentially constant power output level irrespective of a drop of the ambient temperature.

When using laser aiming devices operating in the invisible spectrum, the user of the device must wear goggles of a type that will permit viewing of the irradiating laser beam. Far and away the most common of these devices is the class of night vision goggles that multiplies available light to produce an image of the scene being viewed. Because these devices operate on the principle of light amplification, under low light conditions such as under cloud cover or inside an enclosed structure, these devices are of limited use. Conversely, because of the ability of these devices to multiply available light thousands of times, any source of bright light in an otherwise low light scene will cause a bloom or glare similar of the kind encountered with an automobile's headlights on a dark night. Because of this glare, the viewing scene becomes washed in glare and features are indistinguishable. This condition is aggravated with the decrease in ambient light. Furthermore, the scene viewed through night vision goggles is monochromatic and many lack depth of field provided by a stereo graphic image. As a result, it is often difficult to visually acquire a dim aiming dot amid a highly textured scene such as a brushy field. As a result of these limitations in night vision technology, combat personnel using these devices need laser aimers that can be variably adjusted to compliment the limitations of night vision goggles rather than aggravate them. Thus, the optimum laser aiming device would have a variable intensity aiming dot that could be adjusted for range and light conditions so as to eliminate any "bloom". Also, the optimum laser aiming device would include auxiliary illumination in the IR (infrared) spectrum to augment available light in low light conditions and provide primary light in conditions where ambient light is unavailable. Finally, the optimum laser aiming device would include a means of causing the aiming dot to pulse in order to facilitate quick visual acquisition in highly textured scenes. An additional benefit would be realized if the laser aimer provided multiple pulse rates so a group of personnel could work together and know which aim point was their own.

SUMMARY OF THE INVENTION

To ensure that a laser aiming device has sufficient power in any foreseeable temperature excursion environments, a temperature compensating circuitry is employed to increase the power applied to an associated laser diode to compensate for the reduced efficiency of the laser diode as a function of temperature increase. Thereby, the radiated laser beam emitted will have sufficient power to illuminate a target with a dot of radiated energy within the range of the firearm irrespective of the ambient temperature. Conversely, when temperature decreases and the laser diode efficiency increases, the temperature compensation circuit reduces power applied so as to maintain eye safe emissions. A switch removable and replaceable only upon dismounting of the laser aiming device from the firearm, determines whether the output power is at an eye safe level or at a maximum power level. By installing an eye safe switch for training exercises, it is impossible for the laser aiming device to emit sufficient power to cause injury to the eyesight of any personnel involved in the training exercise. In a combat environment, a switch permitting full power is installed. Depending upon various considerations of use, a switching capability exists to select continuous or pulsating emissions at one or more rates to help detect the location of the target irradiating beam and a selection of the amount of area illumination of a target by a high power infrared light emitting diode. Furthermore, a capability exists to adjustably select the radiated laser beam brightness to compensate for variations in operating environments.

It is therefore a primary object of the present invention to provide temperature compensating circuitry for a laser aiming device which ensures a constant power output irrespective of changes in the ambient temperature which is of particular concern when the laser aiming device is used in an eye safe mode.

Another object of the present invention is to provide circuitry to compensate for temperature related reduced or increased efficiency of a laser diode in a laser aiming device.

Still another object of the present invention is to provide a captured removable fire switch for a laser aiming device.

Yet another object of the present invention is to provide a remotely operated removable switch for a laser aiming device that cannot be pulled loose.

A further object of the present invention is to require replacement of a removable fire switch to switch operation of the laser aiming device between an eye safe mode and a full power mode.

A still further object of the present invention is to provide removable fire switches that limit the maximum power output when the laser aiming device is operated in either the eye safe mode or in the high power mode.

A still further object of the present invention is to provide a rotary up-down control to adjust aiming dot brightness.

A still further object of the present invention is to provide rotary switch for selecting a continuous, slow pulse rate or fast pulse rate beam of a laser aiming device.

A still further object of the present invention is to provide the capability of selectively illuminating a target with a low or a higher intensity infrared LED as a light source.

A still further object of the present invention is to provide an integral rigid mounting system that allows the device to be quickly and accurately mounted and dismounted from a weapon.

A yet further object of the present invention is to provide a method for operating a laser aiming device in different environments.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 16 illustrates the timing circuit, the LED control circuit and the up/down power control circuit;

FIGS. 17A and 17B illustrates connections to various components;

FIG. 18 illustrates reverse battery, low battery, system lockout and fire switch circuits; and FIG. 19 illustrates the electrical connection between the circuit shown in FIG. 15 and switch 30 shown in FIG. 8.

DESCRIPTION OF THE PREFERRED EMBODIMENT

Figure 1:
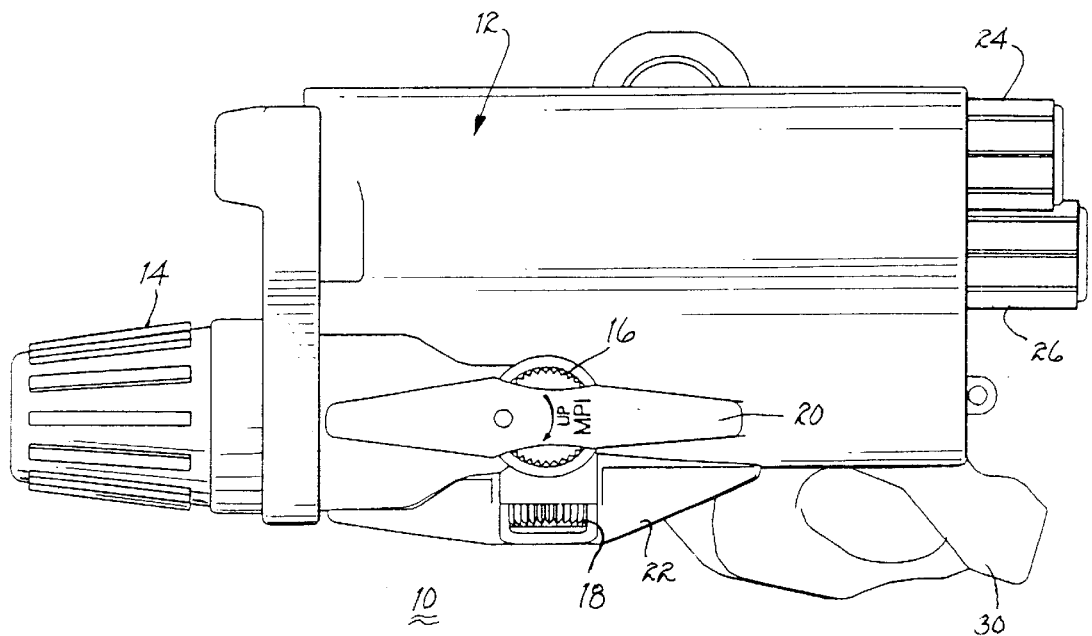
FIG. 1 is a top view of a laser aiming device.
Figure 2:
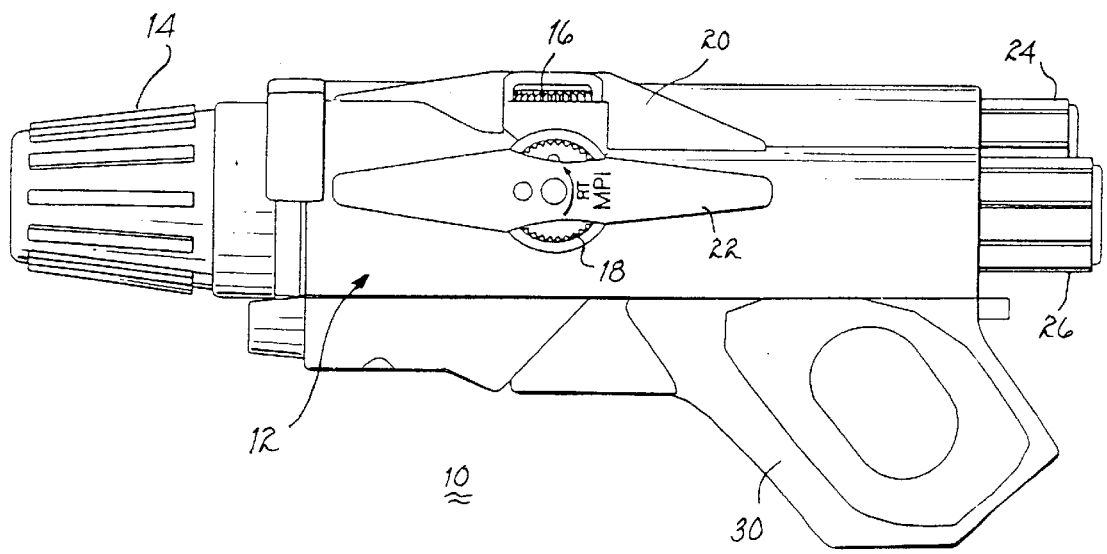
FIG. 2 is a left side view of the laser aiming device.

Referring jointly to FIGS. 1 and 2, there is illustrated a laser aiming device 10 for use with firearms to illuminate a target. The radiated beam may be visible or of a frequency outside the scope of the visible spectrum. In the latter event, a user must employ goggles of the type rendering the radiated beam visible. The device includes a body 12 having a laser aperture generally identified by numeral 14 through which the radiated beam is passed. To align the device with the trajectory of a projectile fired from a firearm to which the device is attached, bore sighting may be used. Bore sight alignment is effective for a limited range as a function of the nature of the firearm, the muzzle velocity of the projectile, and the projectile itself To accommodate for greater ranges, compensation for projectile drop (elevation) and windage must be made. Toward this end, device 10 includes a thumb wheel 16 to adjust for elevation and a further thumb wheel 18 to adjust for windage. A shroud 20 is used in conjunction with thumb wheel 16 and a similar shroud 22 is used in conjunction with thumb wheel 18 to shield the thumb wheels and yet permit manual access to the respective thumb wheels. At the rear of body 12 and visually accessible to a user, a rotary switch 24 permits adjustment of the intensity of the laser aiming beam emitted by the laser diode. A further rotary switch 26 may be employed as a system off switch and to control emission of the laser aiming beam between continuous, slow pulse or fast pulse. Moreover, the level of auxiliary illumination provided by an illuminating LED (LED 138 shown in FIG. 11) to augment light for night vision operations may be set therewith; in this position of rotary switch 26, the laser aiming beam would be continuous and not pulsed.

In a combat environment, the most important criteria attendant laser aiming device 10 is that of the beam irradiating the target. Above a certain power level, the beam will cause irreparable damage to the eye if the beam should strike the eye. The resulting injury is not of consequence in a combat environment but it is unacceptable in a training environment. Accordingly, a removable switch 30 is used to set the maximum power level available from the laser diode generating the beam of visible or non-visible light. As will be described below with further joint reference to FIGS. 3, 4, 5 and 6, removal/replacement of switch 30 is only possible by demounting device 10 from an associated firearm. The purpose for switch 30 is to act as a "fire switch" for actuating operation of the laser aiming device after it has been turned on.

Figure 3:
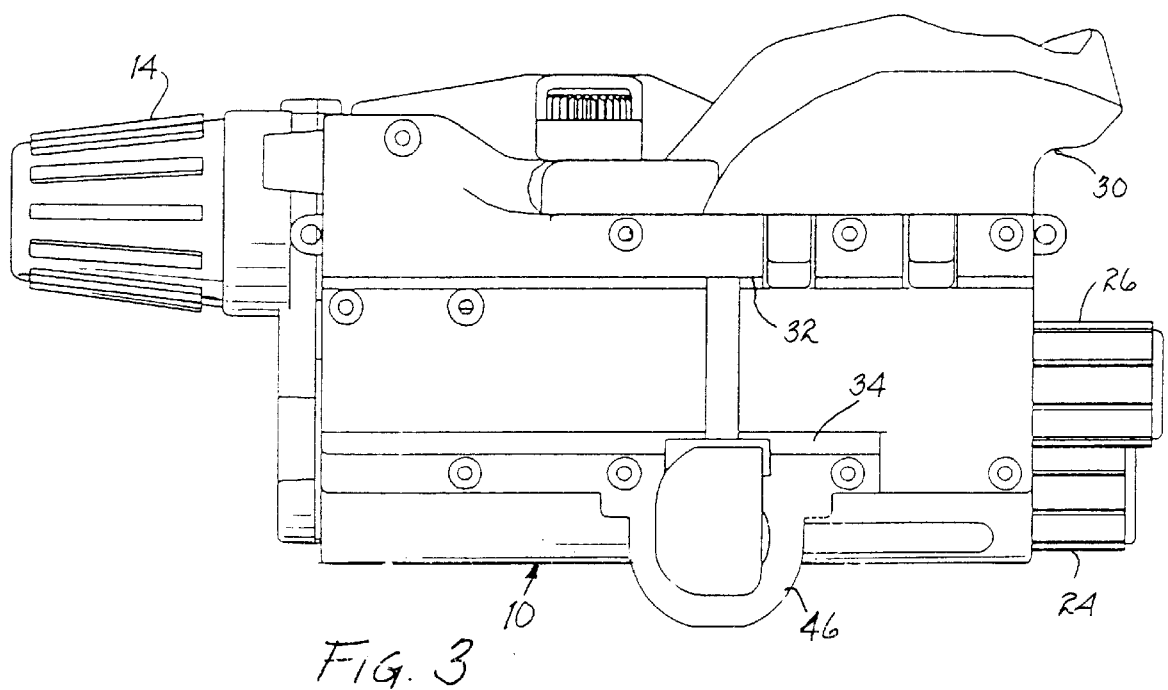
FIG. 3 is a bottom view of the laser aiming device.
Figure 4:
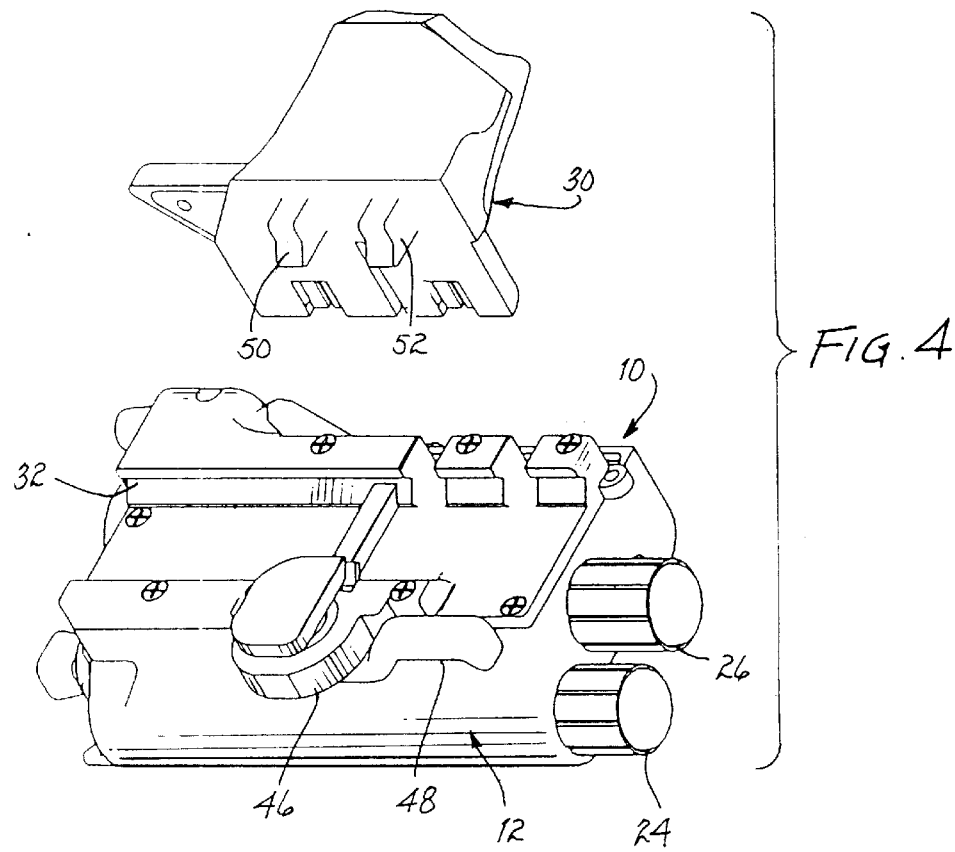
FIG. 4 is an exploded view of the laser aiming device and a removable switch.
Figure 5:
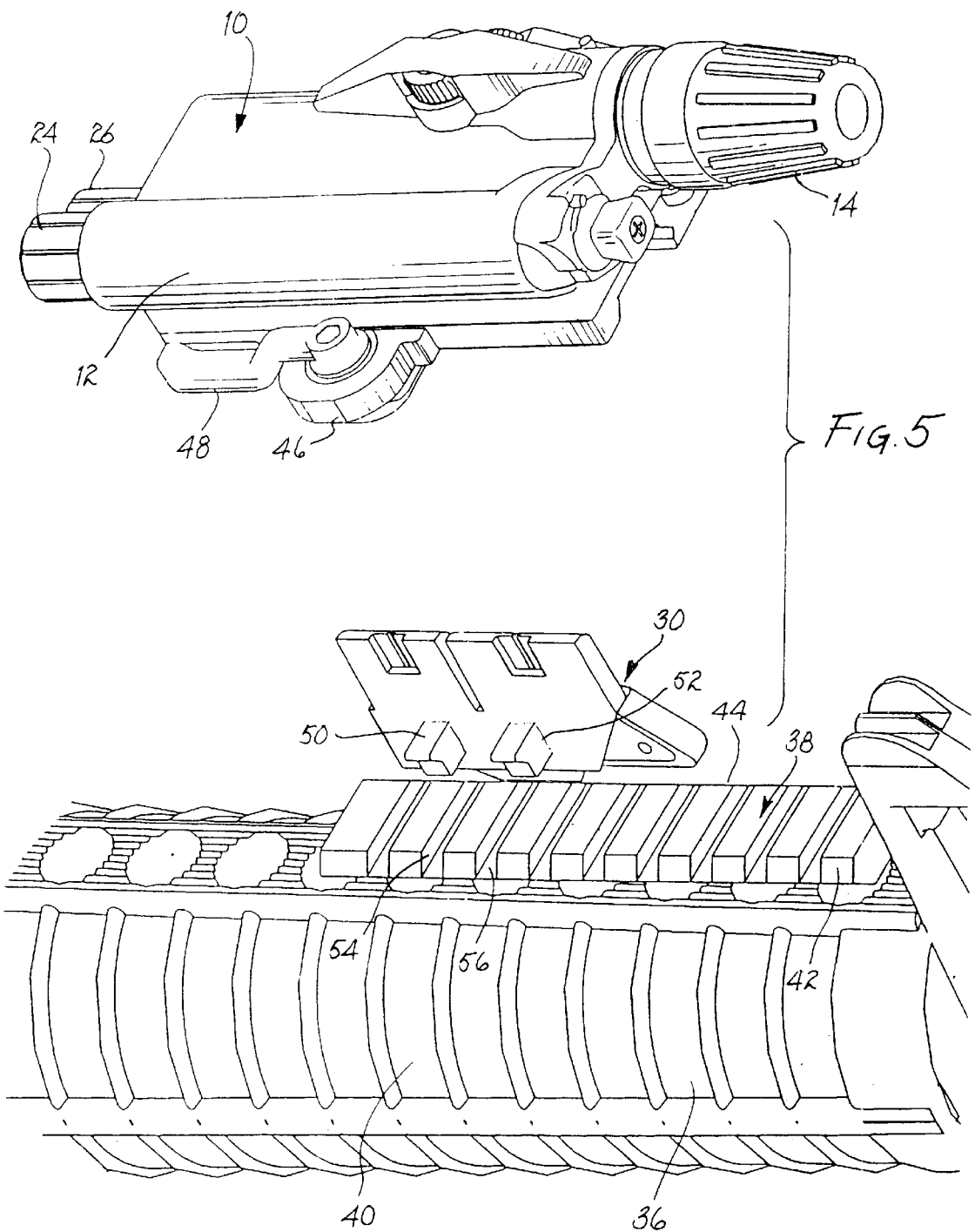
FIG. 5 is an exploded view illustrating the relationships between the laser aiming device, the removable switch, and a mount on a firearm.
Figure 6:
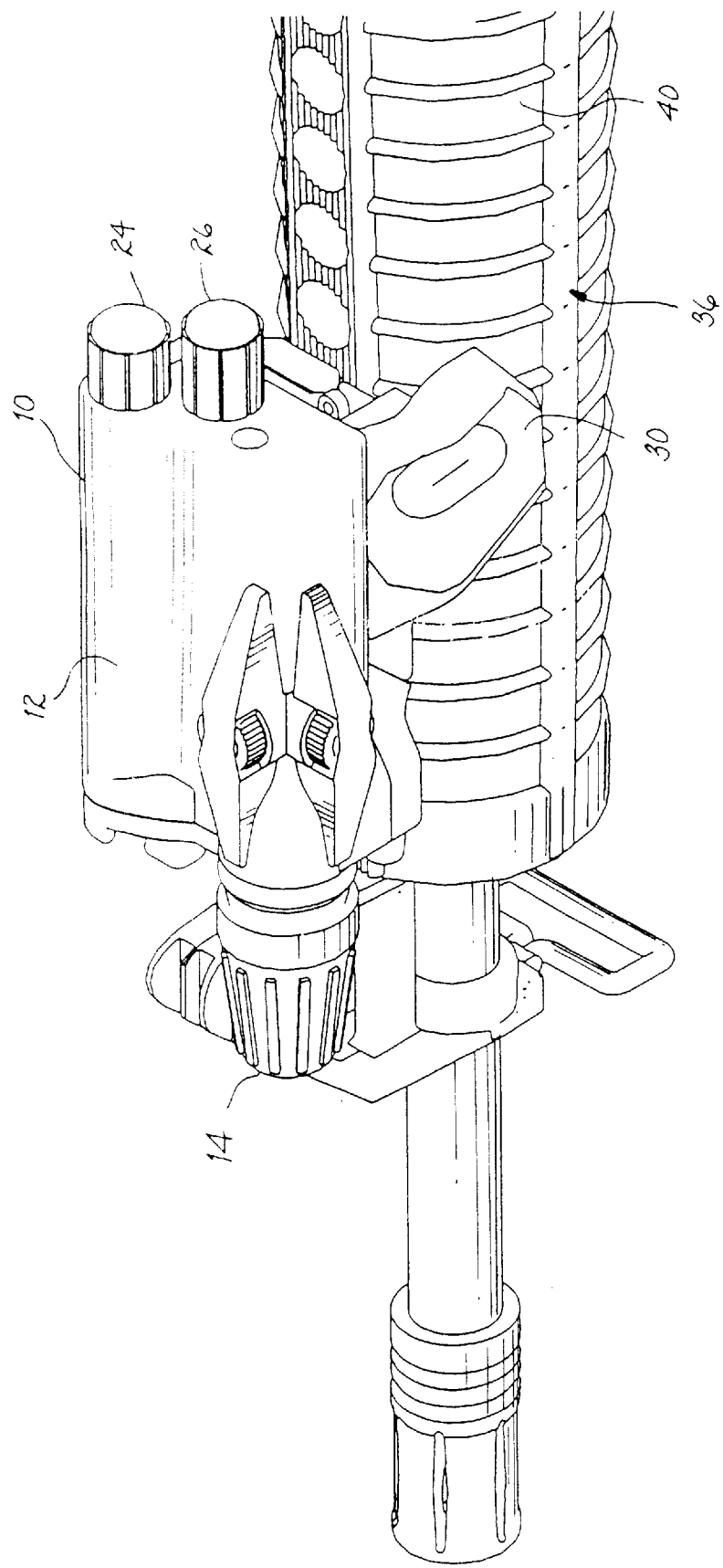
FIG. 6 illustrates the laser aiming device mounted on a firearm.

Referring jointly to FIGS. 3 and 4, there are shown a bottom view and a perspective view, respectively, of laser aiming device 10. On the bottom of body 12, a V-shaped groove 32 is formed on one side and faces an inclined surface 34. Firearms, such as firearm 36 shown in FIGS. 5 and 6 has mounted thereon a Weaver style mount 38 disposed at the top of a barrel assembly 40. The mount includes inclined surfaces 42 mating with inclined surface 34 of body 12. A laterally protruding ridge 44 is disposed on the side of mount 38 opposite from inclined surfaces 42; the cross-sectional configuration of ridge 44 mates with groove 32 in body 12 of laser aiming device 10. A low profile lock mechanism 46, operated by a lever 48, extending from body 12 engages mount 38 to draw body 12 and the mount assembly to one another and thereby, with engagement of ridge 44 with groove 32 and inclined surfaces 34 with inclined surfaces 42, rigidly lock laser aiming device 10 to firearm 36. The resulting rigid mounting is critical to ensure accuracy of alignment despite manhandling of the associated firearm. Furthermore, the lever of the lock mechanism permits quick disconnect and repeatable accuracy for remounting the laser aiming device. Moreover, the low profile reduces the likelihood of the firearm catching on underbrush and the like.

Switch 30 includes a pair of studs 50,52 extending therefrom will engage a pair of slots 54,56 formed as part of mount 38. Upon mounting of switch 30 into laser aiming device 10 and mounting the device upon the firearm, studs 50,52 engage slots 54,56 and preclude removal of switch 30 except upon dismounting of device 10 from the firearm. Thereby, the maximum power level to be emitted by the laser aiming device and controlled by switch 30 cannot be altered by a user except upon dismounting the laser aiming device and thereafter exchanging one switch 30 for another.

Figures 7A, 7B:
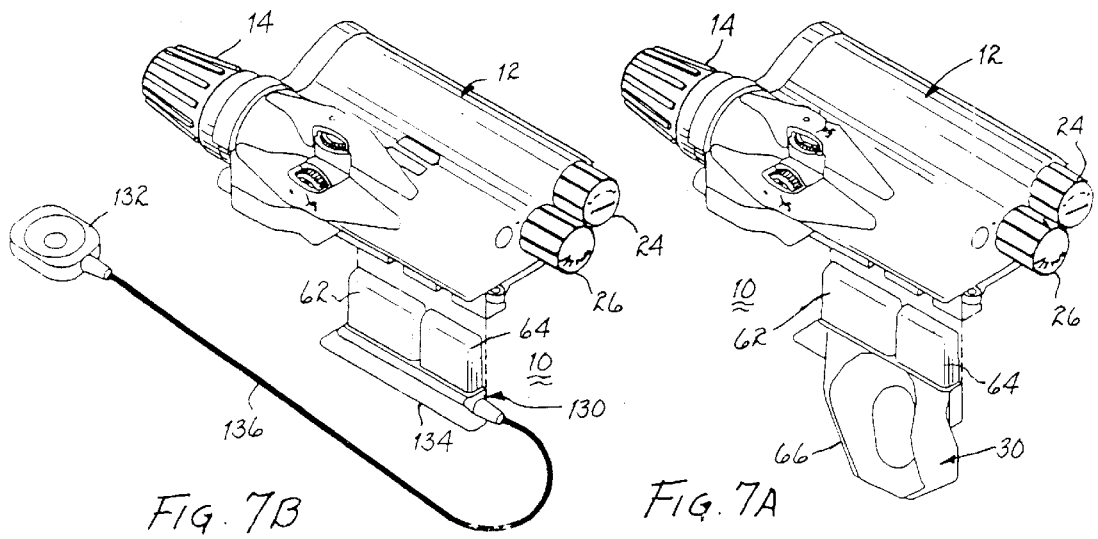
FIG. 7A illustrates the laser aiming device with a removable switch.
FIG. 7B illustrates the laser aiming device with a removable remote switch.
Figure 8:
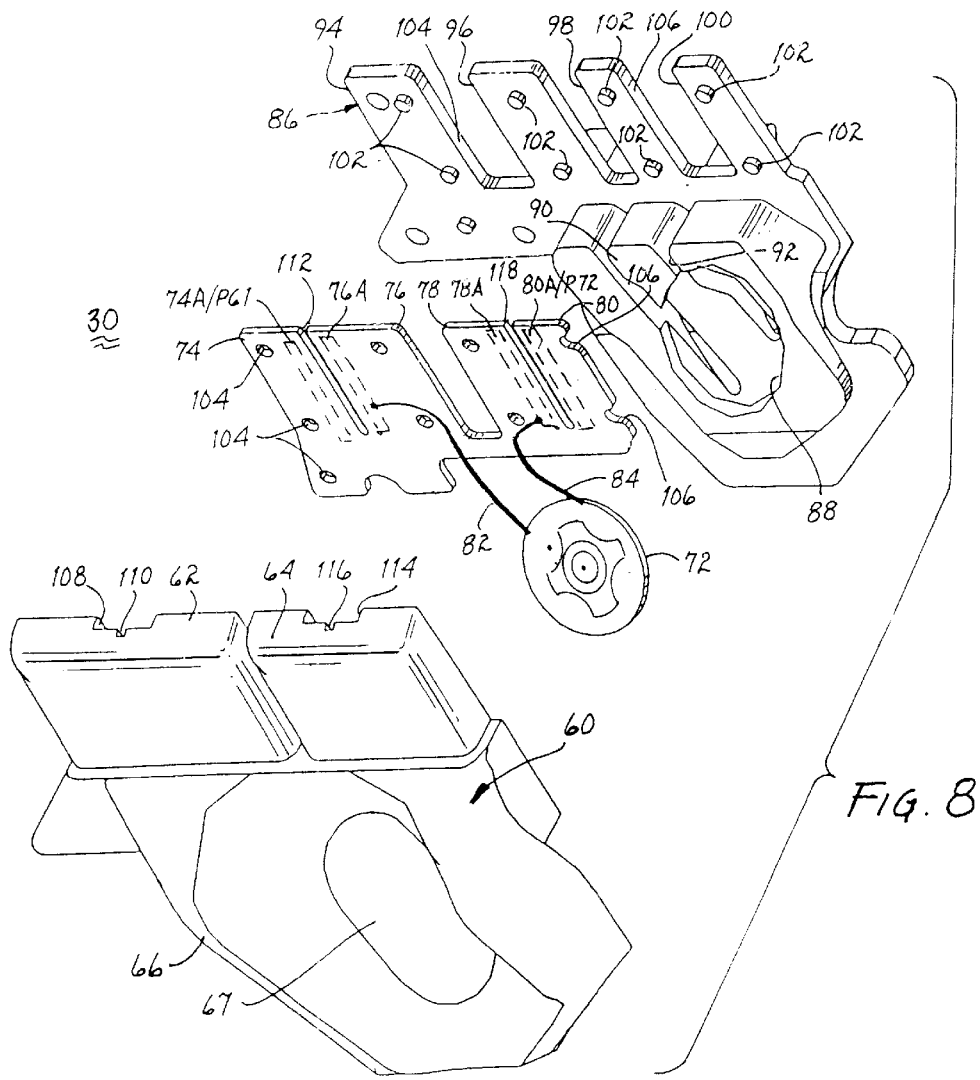
FIG. 8 is an exploded view of the components of the removable switch.
Figure 9:
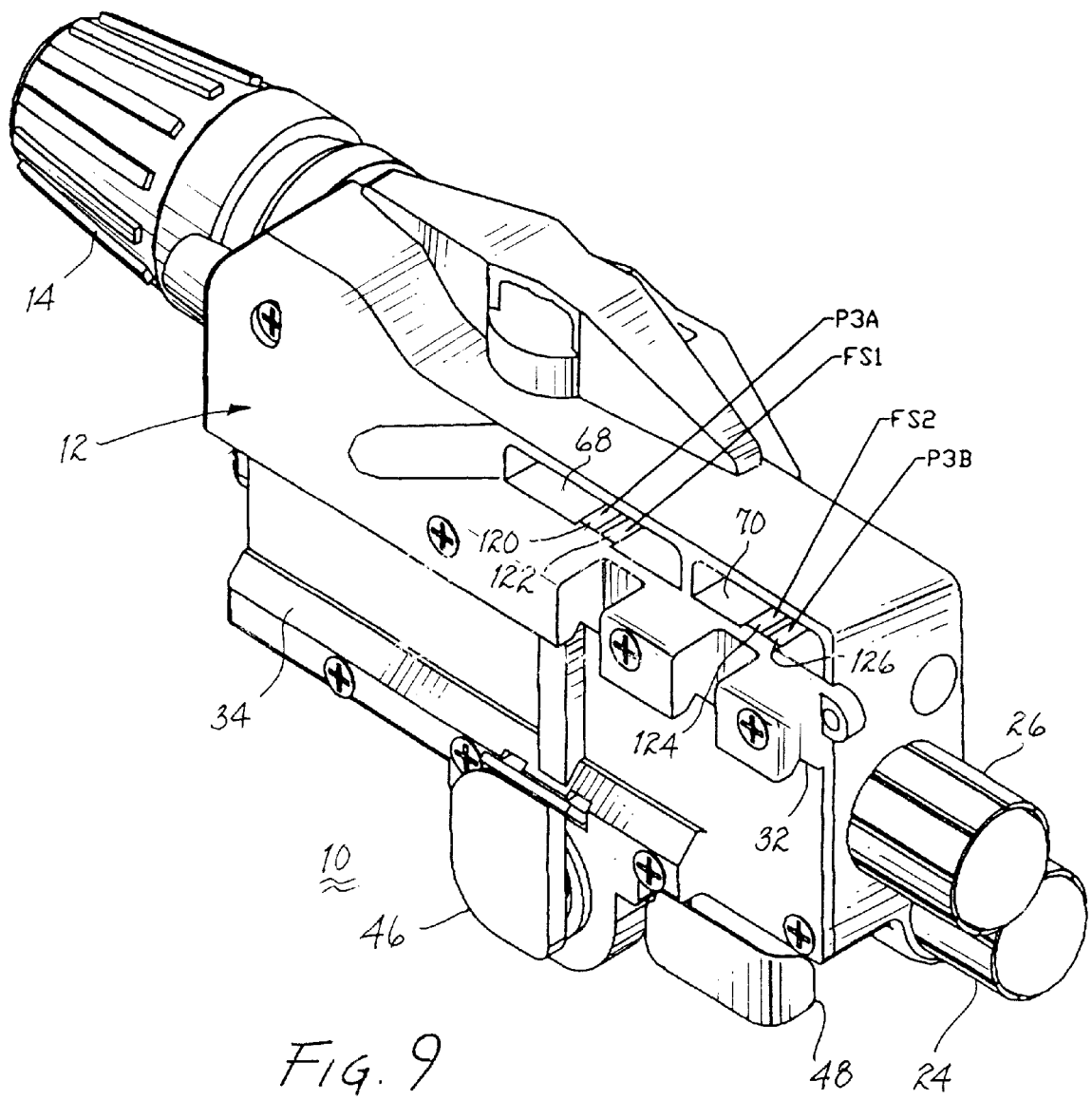
FIG. 9 illustrates the electrical contacts in the laser aiming device associated with the removable switch upon engagement therewith.

Referring jointly to FIGS. 7A, 8 and 9, further details attendant switch 30 will be described. The switch includes a body 60 having a pair of tangs 62,64 at the upper end. A grip 66, including a flexible membrane 67, is disposed at the lower end to aid in inserting and withdrawing tangs 62,64 from within cavities 68,70 (See FIG. 9), respectively, in body 12. A plurality of electrically conductive traces 74A/P61, 76A, 78A, and 80A/P71 are supported upon plates 74, 76, 78 and 80, respectively, of a dielectric board 81. Because these traces appear on the back side of the respective plates, they are shown in dashed lines. In the embodiment of switch 30 used for the full power mode, traces 74A/P61 are interconnected by a jumper trace 83 and in the embodiment of the switch used for the eye safe mode jumper trace 83 is absent or cut, as represented by the "X". A push button switch, the "fire" switch, which may be disk-shaped in configuration as illustrated, is electrically connected to traces 76A and 78A by conductors 82, 84, respectively. Operation of push button switch 72 is accomplished by pressing on membrane 67. By pressing the membrane to close the push button switch and electrically connect traces 76A, 78A, the laser aiming device is activated and becomes operational. A face plate 86 of electrically non-conductive material includes a cavity 88 for receiving push button switch 72, and channels 90,92 for receiving representative conductors 82,84. The face plate includes a plurality of fingers 94,96,98 and 100 having studs 102 for engaging corresponding apertures 104 and indentations 107 in plates 74,76,78 and 80. Upon assembly of switch 30 push button switch 72 will nest in cavity 88 and conductors 82,84 will be in channels 90,92 of face plate 86. Parts of traces 74A/P61, 76A will be exposed through slot 105 between fingers 94,96. Similarly, parts of traces 78A, 80A/P73 will be exposed through slot 106 between fingers 98,100. Upon assembly of the three major components of switch 30, fingers 74,76 will be lodged within channel 108 of tang 62, which channel includes a groove 110 corresponding with slot 112 between plates 74,76. Similarly, channel 114 in tang 64 receives plates 78,80. Groove 116 in the channel corresponds with slot 118 between these two plates. Because face plate 86 is of dielectric material, access to the electrical components of switch 30 is only available via slots 105,106, in face plate 86 to one or the other of the traces corresponding with each slot.

Referring specifically to FIG. 9, cavity 68 includes an electrically conducting element 120 (corresponding with conductor P3A shown in FIG. 15), which may be a plate or a wire and a further electrically conducting element 122 (corresponding with conductor FS1 shown in FIG. 18), which may be a plate or a wire. Upon insertion of tang 62 into cavity 68, exposed plate 74 will come into electrical contact with element 120 and plate 76 will come into electrical contact with element 122. Similarly, cavity 70 includes an element 124 (corresponding with conductor FS2 shown in FIG. 18) and an element 126 (corresponding with conductor P3B shown in FIG. 15), each of which may be a plate or a wire electrically contact plates 78,80, respectively, upon insertion of tang 64 within the cavity.

FIG. 7B illustrates a laser aiming device 10 having a remote fire switch 130 which is a variant of fire switch 30. The remote switch includes essentially all of the components of switch 30 described above with the following exceptions. Grip 66 is eliminated. A push button switch 132, or the like, is electrically connected to body 134 of switch 130 via an electrical conductor 136. The function of push button switch 132 is duplicative of push button switch 72 (see FIG. 8). Depending upon the nature of the firearm with which laser aiming device 10 is used and the position of the user, access to switch 30 might not be convenient or possible. In such event, switch 30 would be replaced by switch 130 and push button switch 132 would be located remote from the laser aiming device at a location accessible to the user to permit actuating (firing) the laser aiming device from the remote location. The remaining benefits and safeguards attendant switch 30 are incorporated in remote switch 130.

Figure 10:
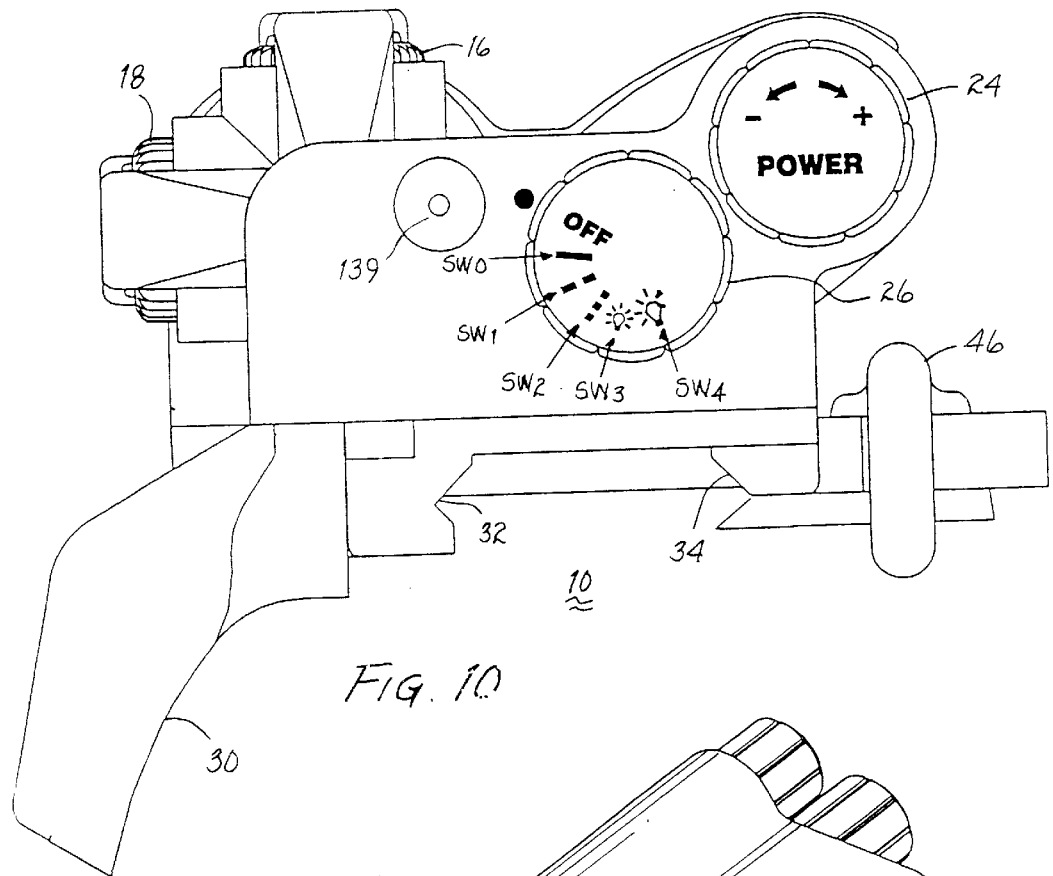
FIG. 10 illustrates a rear view of the laser aiming device with the removable switch installed.

FIG. 10 illustrates a proximal view of laser aiming device 10 to permit a user to make certain adjustments of the power and nature of the emitted laser beam and target illuminating element. As discussed above, switch 24 may be rotated clockwise to increase the power and counter-clockwise to decrease the power of the aiming laser beam as a function of range of interest and to control bloom. Switch 26 may be rotated clockwise to energize the laser aiming device and to select a continuous beam ($SW_0$), a slow pulse rate beam ($SW_1$) or a fast pulse rate beam ($SW_2$). Moreover, the amount of auxiliary/area illumination provided by illuminating LED 138 may be selected between a low level of illumination ($SW_3$) and a high level of illumination ($SW_4$). Preferably LED 138 is a high power infrared LED. One of its purposes is to provide covert illumination for night vision operations in extreme low light conditions. Red LED 139 functions to warn the user of a potentially dangerous low battery condition by turning on when battery voltage has decreased to 2.8 volts.

Figure 11:
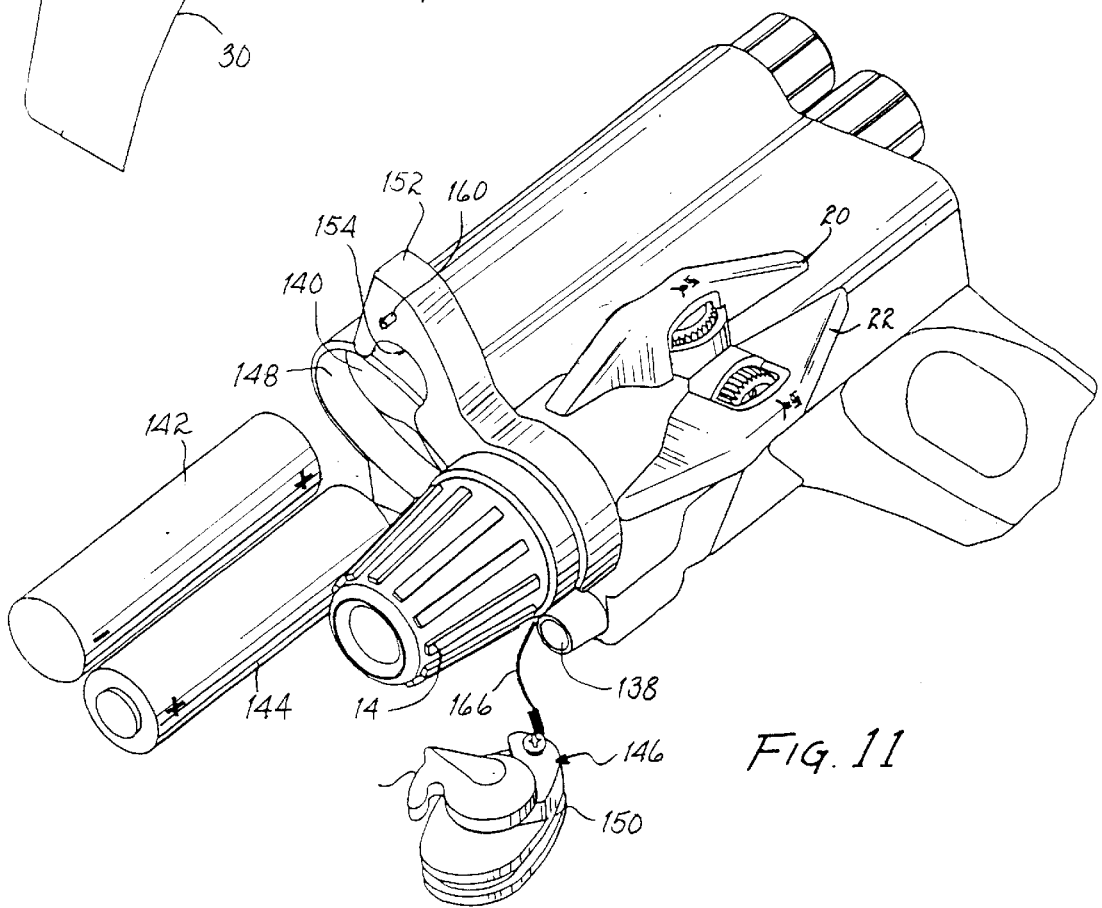
FIG. 11 illustrates the battery and removable cap associated with the laser aiming device.
Figure 12:
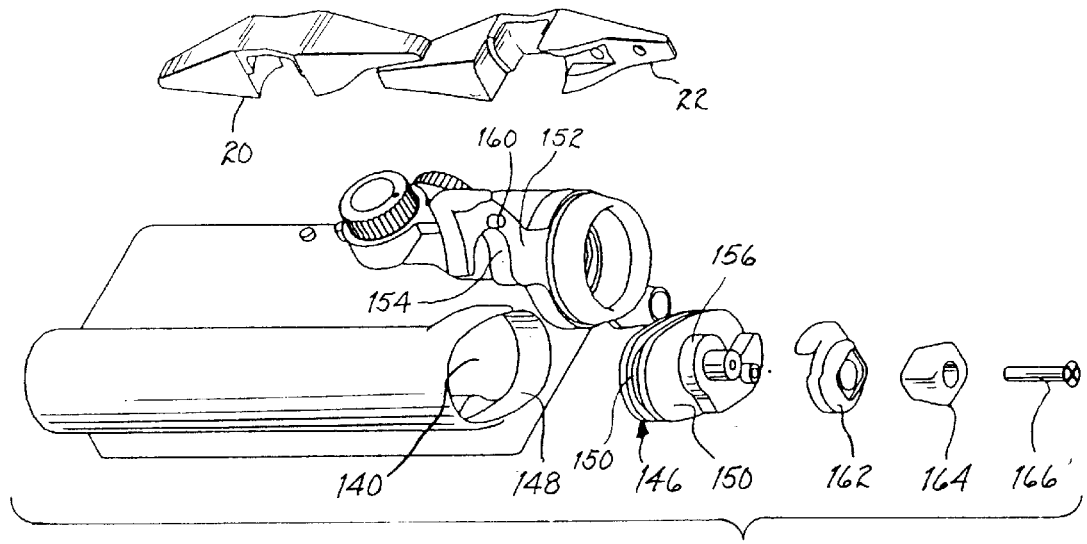
FIG. 12 is an exploded view of the battery compartment sealing mechanisms and shrouds for the elevation and windage adjustments.

Referring jointly to FIGS. 11 and 12, features attendant the battery compartment for the batteries that serve as a 3 volt power source for the laser aiming device will be described in further detail. A battery compartment 140 is configured to receive two conventional AA batteries 142, 144. As is well known, humidity and the presence of water will corrode and possibly short the batteries and render them useless as a power source. It is therefore mandatory that battery compartment 140 be hermetically sealed at the point of entry and removal of the batteries. Moreover, precautions must exist to prevent inadvertent loss of the batteries and yet permit rapid replacement in a comb at situation. A cap 146 is inserted within mouth 148 of battery compartment 140. The cap includes an O-ring 150 extending thereabout for sealed engagement with mouth 148 to prevent incursion of water. The cap is retained in place by a pivotally mounted lever 152 having a partially circular indentation 154 for engagement with a raised land 156 on the cap; the configuration of the land mates with indentation 154. Upon engagement of lever 152 with cap 146, the lever bears against surface 158 to prevent withdrawal of cap 146 from mouth 148. To prevent inadvertent raising of lever 152 and corresponding pivotal movement away from engagement with cap 146, a locking mechanism is provided. This locking mechanism includes a pin 160 extending from lever 152. A catch 162 is pivotally mounted on cap 146. After rotation of lever 152 in a counter-clockwise direction to engage and retain cap 146, catch 162 is rotated in a counter-clockwise direction to engage pin 160. Upon such engagement with the pin, lever 152 is precluded from rotating in the clockwise direction. A retainer 164 and corresponding pin 166 to retain catch 162 are shown in FIG. 12. A cord 168 may be used to attach cap 146 to body 12.

Figure 13:
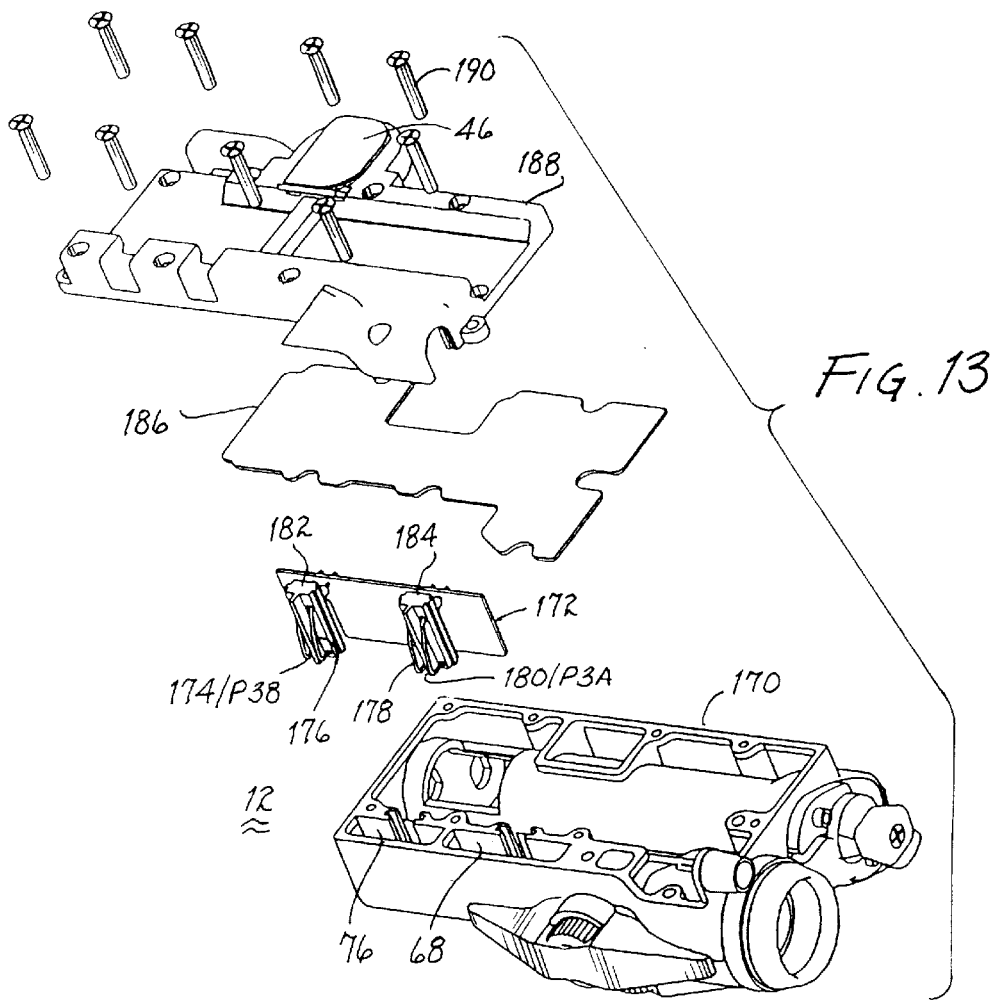
FIG. 13 is an exploded view illustrating the primary top, bottom and interior parts of the laser aiming device.

Referring to FIG. 13, there is shown an exploded view of certain of the components of body 12. Housing 170 includes a circuit board containing the circuit shown in FIG. 18 which supports two pairs of spring loaded wires 174,176 and 178,180 mounted upon elements 182,184 secured to plate 172. These wires 174,176,178 and 180 correspond with and may be the same as elements 120,122,124 and 126 shown in FIG. 10. With such spring loading, electrical contact with the corresponding plates in switch 30 is assured. A circuit board 186 (representatively shown) housing the circuitry and components for the laser aiming device is mounted in housing 170. A cover (bottom) 188 is secured to housing 170 by a plurality of bolts 190 or functionally similar attachment means. It may be noted that locking mechanism 46 is formed as part of cover 188. The circuitry mounted on circuit board 186 will be described in further detail below.

The control circuit to be described has a temperature compensating circuit that counteracts the temperature coefficients of both the laser diode and the controlling drive electronics since a typical laser diode becomes less efficient (less light per current) at a high temperature and more efficient at a lower temperature. To counteract this change in efficiency and therefore effectiveness of the emitted beam, a temperature compensating reference voltage centered upon 1.2 volts has been employed. The amount of compensation per degree of temperature change is controllable to permit customizing the circuit for the type of laser diode beam used. During training exercises, the eye safe power output level provided by the circuit is used. The circuit includes a DC amplifier to amplify the monitor photo-diode output with the amplifier gain set to restrict the maximum laser output to less than 0.7 milliwatts (mw). The output of the amplifier is compared to the temperature compensating reference voltage to control the laser drive circuit. A timing circuit may also be employed to produce pulsed and non-pulsed beam emissions and circuitry is provided to control the degree of illumination provided by the light emitting diode (LED) and degree of laser aiming beam intensity.

Figure 14:
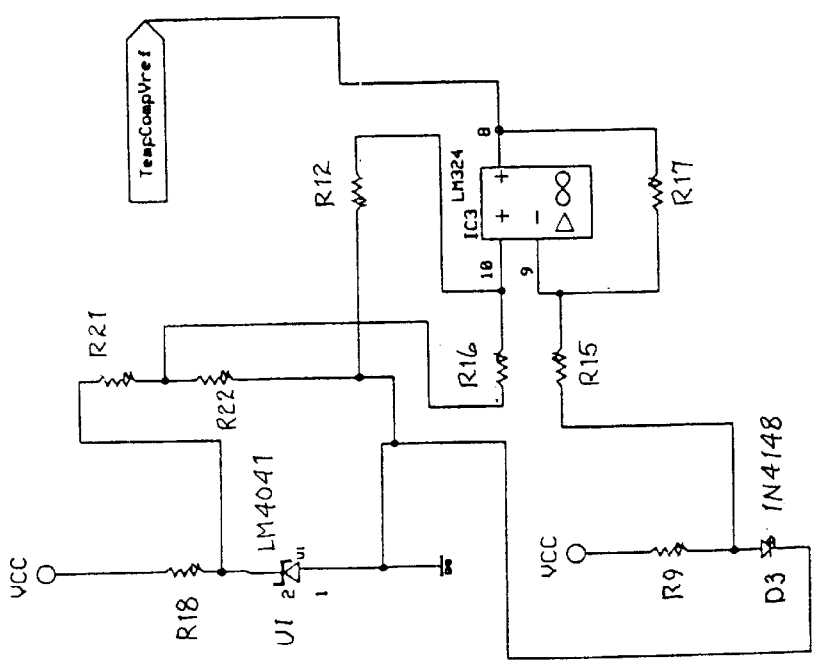
FIG. 14 illustrates a temperature compensation circuit.

Referring to FIG. 14, there is shown a temperature compensation circuit. Temperature compensation is accomplished by combining in a differential amplifier IC3 (LM324) a temperature stabilized reference voltage from a compensated reference diode with the voltage from an uncompensated reference diode. In particular, the temperature stabilized reference voltage from compensated reference diode U1 (LM4041) is fed to a voltage divider R21R22. The output of this divider is fed to pin 10 of IC3 via resistor R16. The voltage of uncompensated reference diode D3 (1N4148) (approximately 2.2 millivolt change in voltage drop per degree Centigrade) is fed via resistor R15 to pin 9 of IC3. The differences between the two voltages on pins 9 and 10, set by the voltage divider (R21,R22) is amplified in differential amplifier IC3 with a gain set (by resistors R12, R15, R16 and R17) to provide the needed reference voltage change per degree Centigrade to compensate for the characteristics of the laser diode being used. The amplified voltage output (pin 8) is the temperature compensation reference voltage (TempCompVref) and is fed to a digital potentiometer U2 (see FIG. 16) to obtain variable power control of the laser diode. The output (VpwrTcompRef) of the variable power control potentiometer U2 is used as the temperature compensated reference voltage on pin 3 of IC3 (see FIG. 15).

Figure 15:
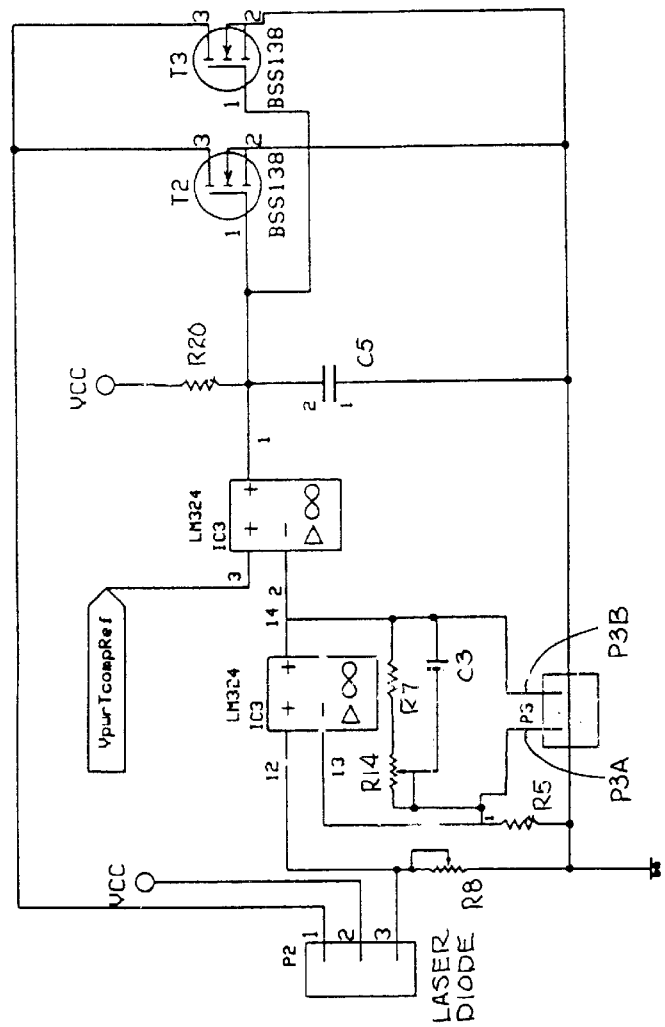
FIG. 15 illustrates the drive circuit and the photo-diode feedback circuit.

The drive circuit for laser diode P2 is shown in FIG. 15. The laser drive current is controlled by the voltages on the gates of field effect transistors T2 and T3. This voltage is built up in the RC network consisting of resistor R20 and capacitor C5 fed by VCC. The amount of gate voltage is controlled by the output on pin 1 of IC3 (LM324) to create a discharge path when the reference voltage (VpwrTcompRef) on pin 3 has been exceeded by the feedback voltage from the monitor photo-diode circuit, which is the input on pin 2 of IC3. The monitor photo-diode feedback circuit will be described below. The current allowed through the laser monitor photo-diode is proportional to the amount of laser light being emitted by the laser diode. This monitor photo-diode current is converted to a voltage by resistor R8, the high power limit trimpot. This voltage is fed into DC gain amplifier IC3. The gain setting for this amplifier is set to 1 for high power mode (when P3*a* and P3*b* are shorted) and to a multiple (set by trimpot resistor R14, resistor R7, resistor R5 and capacitor C3) for the eye safe mode (when P3 and P3*b* are open).

The output of amplifier IC3 on pin 14 is fed into the drive circuit, pin 2 of IC3 to be compared to the temperature compensated reference voltage (VtpwrTcompRef) present on pin 3 of IC3 for controlling the laser light emitted.

The timing circuit is illustrated in FIG. 16. It includes an integrated circuit IC1, resistor R13, resistor R6, resistor R18, capacitor C1, capacitor C6, capacitor C4, switch SW0, switch SW1, switch SW2, and transistor Q1. The core of this circuit is IC1 which is a 555 timer. When the output of IC1 is high, the laser diode shuts off and when the output of IC1 is low, the laser diode is on. The time periods are set with resistors R13, resistor R6 and either capacitor C4 when switch SW1 is on or capacitor C6 when switch SW2 is on. For continuous operation, the reset pin of IC1 is clamped to ground which causes the output of IC1 to stay low as long as the reset is low. Resistor R18 is a pullup resistor to return the reset to high when the reset pin is not clamped to ground. These various timing signals control the on-off operation of the laser by clamping the reference voltage to ground through transistor Q1.

The LED control circuit will also be described with reference to FIG. 16 and includes transistor T5, transistor T6, resistor R11, resistor R4, switch SW4, switch SW3, and the LED. When switch SW3 is closed, field effect transistor T6 is turned on to allow current to flow through resistor R11 to the LED. Resistor R11 limits the current to provide a low level of illumination. Switch SW3 also sets IC1's reset low to cause the laser to have a continuous output. When switch SW4 is closed, field effect transistor T5 is turned on allowing current to flow through resistor R4 to the LED. Resistor R4 limits the current to provide a high level of illumination. Switch SW4 also resets IC1's reset low causing the laser to have a continuous output.

The power control circuit is also described in FIG. 16 and includes digital potentiometer U2 and resistor R3 and a momentary power increase/power decrease (/IPOWER/ DPOWER switch). The temperature compensation reference voltage (TempCompVref) is fed to digital potentiometer U2 which is used with resistor R1 as a voltage divider. The resistance of resistor R1 is chosen to limit the low end resistance of this voltage divider to guarantee a minimum low limit of operation of the laser diode. The output power at wiper pin 6 is used as the reference voltage (VpwrTcompRef) for the laser drive circuit. When the incrementing power switch (/IPOWER) is closed, the digital potentiometer gradually increments to a higher setting resulting in a higher reference voltage for the laser drive circuit. When the decrementing power switch (Dpower) is closed, the digital potentiometer gradually increments to a lower setting resulting in a lower reference voltage (down to the limit set by resistor R1) for the laser drive circuit. This raising and lowering of the reference voltage causes proportional changes in the output power of the laser diode.

Resistor arrays AR1 and AR2 are used as pullups for switches SW0, SW1, SW2, SW3 and SW4 and for /IPOWER; see FIG. 17A. Resistors R19 (FIG. 16) and resistors R23, R24 (See FIG. 17B) are not normally used; their function is to disable or alter functions of the system.

FIG. 18 illustrates reverse battery, low battery warning, system lockout, and fire switch circuits. The reverse battery protection circuit consists of pins 1, 2, 7, and 8 of transistor U101. This is accomplished by passing system current through a P-channel FET has a low forward voltage drop. By connecting the positive terminal of the battery to the FET source (pin 1) and the negative terminal to the FET gate (pin2) allows current to flow through the FET as needed by the system. If the battery is reversed, no current will flow to the system.

The low battery warning circuit consists of IC102, resistor R104, resistor R101, capacitor C103, transistor T102, resistor R106, and LED D101. The IC is an active high reset generator with a reset voltage of 2.63 volts. The sense voltage at pin 3 of IC102 is derived from a voltage divider consisting of resistor R104 and resistor R101. Capacitor C103 stores the sense voltage to reduce power switch noise. D101 is an LED indicator (139 shown in FIG. 10) that has its current limited by resistor R106 to obtain a desired brightness and is switched on with N-channel FET transistor T102 when a low voltage battery condition exists. That is, as the system voltage drops to approximately 2.8 volts, the sense voltage at the voltage divider drops to less than 2.63 volts. This causes the reset generator to go to an active high state which switches transistor T102 on and allows current to flow through the LED (139 shown in FIG. 10) to indicate a low voltage condition.

The system lockout circuit consists of resistor R102, resistor R107, IC101, capacitor C104, and transistor T101. IC101 is a 2.63 volt active low reset generator. Resistor R102 is a current limiting resistor to reset the generator. Resistor R107 is a pulldown resistor assuring that pin 1 on transistor T101 goes low during reset. Capacitor C104 stores the system voltage sensed by the reset generator to reduce power switch noise. When the system voltage drops below 2.63 volts, the reset generator goes to its active low state which turns off transistor T101 and disconnects fire switch FS2 from ground. Thereby, the fire switch circuit, FS1, FS2 is prevented from activating transistor U101.

The fire switch circuit consists of resistor R103, fire switch FS1, fire switch FS2, and pins 3, 4, 5, and 6 of transistor U101. Transistor U101 is a P-channel FET. Resistor R103 is a pullup resistor for gate pin 4 assuring a high state when five switches FS1 and FS2 are not shorted, 5 thereby turning off transistor U101. When gate pin 4 of transistor U101 is grounded, transistor U101 will turn on and supply VCC to the main system circuit board. Shorting five switches FS1 and FS2 will ground pin 4 of transistor U101 as long as the system voltage is above 2.63 volts. When the system voltage drops below 2.63 volts, the path to ground through transistor T101 is removed.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

I claim:

1. A laser aiming device for use with a firearm, said device comprising in combination:
    a) a body;
    b) a laser diode housed within said body for emitting a laser aiming beam to be aimed at a target, including a power circuit for providing electrical power to said laser diode;
    c) a temperature compensating circuit housed within said body for maintaining constant the power level of the laser aiming beam emitted from said laser diode;
    d) a fire switch detachably attached to said body for actuating said laser diode and for limiting the maximum power of the laser aiming beam;
    e) a lock mechanism attached to said body for mounting and dismounting said device on the firearm;

f) means for accommodating detachment and attachment of said switch only upon dismounting said device from the firearm through operation of said lock mechanism;

g) a light emitting diode (LED) housed within said body for providing auxiliary illumination of the target, including a circuit for providing power to said LED;

h) a first control for energizing said power circuit, for selecting a continuous laser aiming beam, a slow pulse rate or a fast pulse rate for the laser aiming beam and for regulating the intensity of said LED; and i) a second control for varying the intensity of the laser aiming beam.

2. The device as set forth in claim 1 wherein said switch comprises either a first switch for limiting the power output of said laser diode to limit the power of the laser aiming beam to an eye safe level or a second switch for permitting a power output of said laser diode to provide a power level for the laser aiming beam in excess of the eye safe level.

3. The device as set forth in claim 1 wherein said switch includes a push button switch remote from said body.

4. The device as set forth in claim 3 wherein said switch comprises either a first switch for limiting the power output of said laser diode to limit the power of the laser aiming beam to an eye safe level or a second switch for permitting a power output of said laser diode to provide a power level for the laser aiming beam in excess of the eye safe level.

5. The device as set forth in claim 2 wherein said temperature compensating circuit precludes an increase of the power output in excess of the eye safe level when said laser diode is subjected to a drop in temperature.

6. The device as set forth in claim 1 wherein the firearm includes a weaver style mount, and wherein said lock mechanism engages said weaver style mount and includes a quick disconnect for dismounting and mounting said device on the firearm with repeatable positioning accuracy.

7. The device as set forth in claim 6 wherein said quick disconnect includes a pivotally mounted lever.

8. The device as set forth in claim 1 wherein said first and second controls comprise rotary switches.

9. The device as set forth in claim 1 including means for adjusting the laser aiming beam relative to the firearm for elevation and windage.

10. The device as set forth in claim 1 wherein the frequency of the laser aiming beam and the illumination beam is outside the visible spectrum.

11. The device as set forth in claim 10 wherein the frequency of the laser aiming beam is within the range of infrared frequencies.

12. The device as set forth in claim 1 wherein the frequency of the laser beam and the illumination beam is within the visible spectrum.

13. The device as set forth in claim 1 including a battery for providing electrical power to said device, a circuit for determining the voltage of said battery and a visually perceivable indicator for low battery voltage condition.

14. A laser aiming device for use with a firearm to aim the firearm at a target, said device comprising in combination:

a) a laser diode for emitting a laser aiming beam;

b) a switch for activating said laser diode to emit the laser aiming beam, said switch being detachably attachable to said device;

c) a lock mechanism for selectively mounting and dismounting said device on the firearm; and d) means for capturing said switch between said device and said firearm upon mounting of said device upon the firearm.

15. The device as set forth in claim 14 including a light emitting diode for providing auxiliary illumination of the target.

16. The device as set forth in claim 14 wherein said switch includes a push button for activating said laser diode.

17. The device as set forth in claim 16 wherein said push button is located remote from said device.

18. The device as set forth in claim 14 including means for selecting a continuous, slow pulse rate or fast pulse rate laser aiming beam.

19. The device as set forth in claim 14 including means for adjusting the intensity of the laser aiming beam.

20. The device as set forth in claim 14 wherein said lock mechanism is a lever operated quick disconnect mechanism.

21. A laser aiming device for use with a firearm to aim the firearm at a target, said device comprising in combination:

a) a laser diode for emitting a laser aiming beam;

b) a switch for activating said laser diode to emit the laser aiming beam, said switch being detachably attachable to said device and including means for limiting the maximum power level of the laser aiming beam;

c) a lock mechanism for selectively mounting and dismounting said device on the firearm; and d) means for precluding detachment of said switch from said device upon mounting of said device upon the firearm.

22. The device as set forth in claim 14 including means for adjusting the intensity of the laser aiming beam.

23. The device as set forth in claim 22 including a light emitting diode for providing auxiliary illumination of the target.

24. A laser aiming device for use with a firearm to aim the firearm at a target, said device comprising in combination:

a) a laser diode for emitting a laser aiming beam;

b) a switch for activating said laser diode to emit the laser aiming beam, said switch being detachably attachable to said device;

c) a temperature compensation circuit for compensating for changes in efficiency of the laser diode as a function of temperature;

d) a lock mechanism for selectively mounting and dismounting said device on the firearm; and e) means for precluding detachment of said switch from said device upon mounting of said device upon the firearm.

25. A method for generating a laser aiming beam from a laser aiming device detachably mounted on a firearm to assist in aiming the firearm at a target, said method comprising the steps of:

a) producing the laser aiming beam by actuation of a laser diode;

b) capturing a switch between the device and the firearm when the device is mounted upon the firearm;

c) precluding detachment of the switch when the device is mounted on the firearm; and d) actuating the laser diode with the switch.

26. A method for generating a laser aiming beam from a laser aiming device detachably mounted on a firearm to assist in aiming the firearm at a target, said method comprising the steps of:

a) producing the laser aiming beam by actuation of a laser diode;

b) limiting the maximum power level of the laser aiming beam with the switch;

c) detachably attaching a switch to the device when the device is dismounted from the firearm;

d) precluding detachment of the switch when the device is mounted on the firearm; and e) actuating the laser diode with the switch.

27. A method for generating a laser aiming beam from a laser aiming device detachably mounted on a firearm to assist in aiming the firearm at a target, said method comprising the steps of:

a) producing the laser aiming beam by actuation of a laser diode;

b) preventing an increase of the power level of the laser aiming beam as a function of a drop in temperature of the laser diode;

c) detachably attaching a switch to the device when the device is dismounted from the firearm;

d) precluding detachment of the switch when the device is mounted on the firearm; and e) actuating the laser diode with the switch.

28. A method for generating a laser aiming beam from a laser aiming device detachably mounted on a firearm to assist in aiming the firearm at a target, said method comprising the steps of:

a) producing the laser aiming beam by actuation of a laser diode, b) compensating for changes in efficiency of the laser diode as a function of temperature, c) detachably attaching a switch to the device when the device is dismounted from the firearm;

d) precluding detachment of the switch when the device is mounted on the firearm; and e) actuating the laser diode with the switch.

29. The method as set forth in claim 25 including the step of providing an auxiliary illuminating beam to light the target area.

30. The method as set forth in claim 29 including the step of adjusting the illumination provided by the auxiliary illuminating beam.

31. The method as set forth in claim 25 including the step of actuating the switch at a location remote from the device.

32. The method as set forth in claim 25 including the step of adjusting the intensity of the laser aiming beam.

33. A method for generating a laser aiming beam from a laser aiming device detachably mounted on a firearm to assist in aiming the firearm at a target, said method comprising the steps of:

a) producing the laser aiming beam by actuation of a laser diode;

b) limiting the power of the laser aiming beam to an eye safe level with the switch;

c) detachably attaching a switch to the device when the device is dismounted from the firearm;

d) precluding detachment of the switch when the device is mounted on the firearm; and e) actuating the laser diode with the switch.

34. The method as set forth in claim 25 including the step of mounting the device on the firearm with a quick disconnect lock mechanism.

35. A method for generating a laser aiming beam from a laser aiming device detachably mounted on a firearm to assist in aiming the firearm at a target, said method comprising the steps of:

a) producing the laser aiming beam by actuation of a laser diode;

b) detachably attaching a switch to the device when the device is dismounted from the firearm;

c) precluding detachment of the switch when the device is mounted on the firearm;

d) actuating the laser diode with the switch; and e) compensating for changes in efficiency of the laser diode as a function of temperature.

36. The method as set forth in claim 35 including the step of operating the switch from a location remote from the device.

37. The method as set forth in claim 35 including the step of illuminating the area of the target with an auxiliary illuminating beam emanating from within the device.

38. A laser aiming device mountable upon a firearm for use with the firearm to aim the firearm at a target, said device comprising in combination:

a) a laser diode for emitting a laser aiming beam;

b) a fire switch for limiting the power level of the laser aiming beam to a preset level, said switch being detachably attachable to said device;

c) a temperature compensation circuit for compensating for changes in efficiency of said laser diode as a function of temperature to maintain the power level of the laser aiming beam constant; and d) means for precluding detachment of said switch from said device when said device is mounted upon the firearm.

39. The device as set forth in claim 38 including a light emitting diode for providing auxiliary illumination of the target.

40. The device as set forth in claim 38 including means for adjusting the intensity of the laser aiming beam.

41. The device as set forth in claim 40 including a light emitting diode for providing auxiliary illumination of the target.

42. The device as set forth in claim 41 including means for varying the amount of auxiliary illumination provided by said light emitting diode.

43. The device as set forth in claim 38 including means for actuating said switch from a location remote from said device.

44. A laser aiming device mountable upon a firearm for use with the firearm to aim the firearm at a target, said device comprising in combination:

a) a laser diode for emitting a laser aiming beam;

b) a fire switch for energizing said laser diode, said switch being detachably attachable to said device; and c) means for capturing said switch between the firearm and said device when said device is mounted upon the firearm.

45. The device as set forth in claim 44 including a light emitting diode for providing auxiliary illumination of the target and means for varying the amount of auxiliary illumination provided by said light emitting diode.

46. A method for generating a laser aiming beam and an illuminating beam from a laser aiming device detachably mounted on a firearm to assist in aiming the firearm at a target, said method comprising the steps of:

a) producing the laser aiming beam by actuation of a laser diode;

b) detachably attaching a switch to the device when the device is dismounted from the firearm;

c) locking the switch between the firearm and the device when the device is mounted on the firearm;

d) actuating the laser diode with the switch; and e) further producing an auxiliary illuminating beam emanating from within the device to illuminate the area of the target.

47. A method for generating a laser aiming beam from a laser aiming device detachably mounted on a firearm to assist in aiming the firearm at a target, said method comprising the steps of:

a) producing the laser aiming beam by actuation of a laser diode;

b) detachably attaching a switch to the device when the device is dismounted from the firearm;

c) further producing an auxiliary illuminating beam emanating from a fixed focus light emitting diode having a fixed focus integral lens disposed within the device to illuminate the area of the target.

48. A laser aiming device for use with a firearm, said device comprising in combination:

a) a body;

b) a laser diode housed within said body for emitting a laser aiming beam to be aimed at a target, including a power circuit for providing electrical power to said laser diode;

c) a fire switch detachably attached to said body for actuating said laser diode and for limiting the maximum power of the laser aiming beam;

d) a light emitting diode (LED) housed within said body for providing auxiliary illumination of the target, including a circuit for providing power to said LED.

49. A method for generating a laser aiming beam from a laser aiming device detachably mounted on a firearm to assist in aiming the firearm at a target and for illuminating the target, said method comprising the steps of:

a) producing the laser aiming beam by actuation of a laser diode disposed within the device;

b) providing auxiliary illumination of the target with a light emitting diode disposed within the device; and c) actuating the laser diode with a switch detachably attached to the device; and d) limiting the maximum power of the laser aiming beam with the switch.

* * * * *